United States Patent
Tsubaki

(10) Patent No.: US 10,160,481 B2
(45) Date of Patent: Dec. 25, 2018

(54) ELECTRIC POWER STEERING APPARATUS AND CONTROL APPARATUS DETERMINING PARAMETER SET TO THE SAME

(71) Applicant: NSK Ltd., Tokyo (JP)

(72) Inventor: Takahiro Tsubaki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/552,600

(22) PCT Filed: Feb. 12, 2016

(86) PCT No.: PCT/JP2016/054060
§ 371 (c)(1),
(2) Date: Aug. 22, 2017

(87) PCT Pub. No.: WO2016/143454
PCT Pub. Date: Sep. 15, 2016

(65) Prior Publication Data
US 2018/0022377 A1    Jan. 25, 2018

(30) Foreign Application Priority Data

Mar. 10, 2015   (JP) ................. 2015-047177
Mar. 10, 2015   (JP) ................. 2015-047178
Mar. 19, 2015   (JP) ................. 2015-055889

(51) Int. Cl.
*B62D 5/04*       (2006.01)
*B62D 6/10*       (2006.01)

(52) U.S. Cl.
CPC ............ *B62D 5/0466* (2013.01); *B62D 6/10* (2013.01); *B62D 5/0463* (2013.01)

(58) Field of Classification Search
CPC ....... B62D 5/0466; B62D 6/10; B62D 5/0463
See application file for complete search history.

(56) References Cited

U.S. PATENT DOCUMENTS

2012/0296525 A1* 11/2012 Endo .................... B62D 5/0466
701/42

FOREIGN PATENT DOCUMENTS

| JP | 2007-314005 A | 12/2007 |
| JP | 2008-120343 A | 5/2008 |
| WO | 2011/101979 A1 | 8/2011 |
| WO | 2015/025942 A1 | 2/2015 |

OTHER PUBLICATIONS

International Search Report of PCT/JP2016/054060 dated Apr. 19, 2016 [PCT/ISA/210].

* cited by examiner

*Primary Examiner* — Mussa A Shaawat
*Assistant Examiner* — Michael V Kerrigan
(74) *Attorney, Agent, or Firm* — Sughrue Mion, PLLC

(57) ABSTRACT

An electric power steering apparatus that achieves a desired steering characteristic in minutely steering at on-center, suppresses frictional feeling, and improves linear steering feeling at on-center, and a control apparatus that determines a parameter. The apparatus calculates a current command value by using an assist map related to a steering torque and a vehicle speed, drives a motor based on the current command value, and assists and controls a steering system.

18 Claims, 14 Drawing Sheets

ELECTRIC POWER STEERING APPARATUS AND CONTROL APPARATUS DETERMINING PARAMETER SET TO THE SAME

CROSS REFERENCE TO RELATED APPLICATIONS

This application is a National Stage of International Application No. PCT/JP2016/054060, filed Feb. 12, 2016, claiming priorities based on Japanese Patent Application Nos. 2015-047177 and 2015-047178, filed Mar. 10, 2015 respectively, and 2015-055889, filed Mar. 19, 2015, the contents of all of which are incorporated herein by reference in their entirety.

TECHNICAL FIELD

The present invention relates to an electric power steering apparatus that achieves a desired steering characteristic (a minute and slow steering region) at on-center (in the vicinity of a neutral position) by means of an assist map that calculates a current command value, and a self-aligning torque (SAT) compensating-cum-virtual spring compensating section that calculates a compensation signal, which compensates the current command value, on the basis of a column angle (a column output side angle) or a steering wheel angle (a column input side angle) serving as steering angle information, and to a control apparatus that determines a parameter set to the same.

BACKGROUND ART

An electric power steering apparatus (EPS) which provides a steering mechanism of a vehicle with a steering assist torque (an assist torque) by means of a rotational torque of a motor, applies a driving force of the motor as the steering assist torque to a steering shaft or a rack shaft by means of a transmission mechanism such as gears or a belt through reduction gears. In order to accurately generate the steering assist torque, such a conventional electric power steering apparatus performs feedback control of a motor current. The feedback control adjusts a voltage supplied to the motor so that a difference between a current command value and a detected motor current value becomes small, and the adjustment of the voltage supplied to the motor is generally performed by an adjustment of a duty ratio of pulse width modulation (PWM) control.

A general configuration of the conventional electric power steering apparatus will be described with reference to FIG. 1. As shown in FIG. 1, a column shaft (a steering shaft, a handle shaft) 2 connected to a steering wheel 1 is connected to steered wheels 8L and 8R through reduction gears 3, universal joints 4a and 4b, a rack and pinion mechanism 5, tie rods 6a and 6b, further via hub units 7a and 7b. In addition, a torsion bar (not shown) is inserted into the column shaft 2, the column shaft 2 is provided with a steering angle sensor 14 for detecting a steering angel θ of the steering wheel 1 in accordance with a twist angle of the torsion bar and a torque sensor 10 for detecting a steering torque Th, and a motor 20 for assisting a steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist (steering assist) command based on the steering torque Th detected by the torque sensor 10 and a vehicle speed Vel detected by a vehicle speed sensor 12, and controls a current supplied to the motor 20 by means of a voltage control value Vref obtained by performing compensation or the like to the current command value. Moreover, it is possible to receive the vehicle speed Vel from a controller area network (CAN) or the like.

Further, the steering angle sensor 14 is not essential, it does not need to be provided, and it is possible to obtain the steering angle from a rotation sensor such as a resolver connected to the motor 20.

A controller area network (CAN) 40 to exchanging various information of a vehicle is connected to the control unit 30, and it is also possible to receive the vehicle speed Vel from the CAN 40. Further, it is also possible to connect a non-CAN 41 exchanging a communication, analog/digital signals, a radio wave or the like except the CAN 40 to the control unit 30.

The control unit 30 mainly comprises a CPU (including an MCU, an MPU and so on), and general functions performed by programs within the CPU are shown in FIG. 2.

Functions and operations of the control unit 30 will be described with reference to FIG. 2. As shown in FIG. 2, the steering torque Th detected by the torque sensor 10 and the vehicle speed Vel detected by the vehicle speed sensor 12 (or from the CAN 40) are inputted into a current command value calculating section 31. The current command value calculating section 31 calculates a current command value Iref1 for which the vehicle speed Vel is a parameter by using an assist map. The calculated current command value Iref1 is phase-compensated in a phase compensating section 32 for enhancing stability of a steering system, and a phase-compensated current command value Iref2 is inputted into an adding section 33. The steering torque Th is inputted into a differential compensating section 35 being a feedforward system for enhancing a response speed, and a differential-compensated steering torque Thd is inputted into the adding section 33. The adding section 33 adds the current command value Iref2 and the steering torque Thd, and a current command value Iref3 being the addition result is inputted into a subtracting section 34.

The subtracting section 34 obtains a deviation Iref4 (=Iref3−Im) between the current command value Iref3 and a motor current value Im being fed back. Proportional integral (PI) control or the like is applied to the deviation Iref4 in a current control section 36, the voltage control value Vref is inputted into a PWM-control section 37, where the duty ratio is calculated, and the motor 20 is PWM-driven through an inverter 38. The motor current value Im of the motor 20 is detected by a motor current detector 39 and is fed back to the subtracting section 34.

In such an electric power steering apparatus, a method of performing feedback by using a self-aligning torque (SAT) has been conventionally proposed as a measure for improving on-center feeling, for example, as disclosed in WO 2011/101979 (Patent Document 1).

THE LIST OF PRIOR ART DOCUMENTS

Patent Documents

Patent Document 1: WO 2011/101979

SUMMARY OF THE INVENTION

Problems to be Solved by the Invention

However, in a control apparatus shown in Patent Document 1, since detecting the SAT is very difficult by influences of mechanical friction, a spring property of a torsion bar and so on in minutely steering at on-center, there is a problem that steering feeling becomes nonlinear steering feeling such as frictional feeling, and achieving a desired steering characteristic is difficult.

The present invention has been developed in view of the above-described circumstances, and an object of the present invention is to provide an electric power steering apparatus that achieves a desired steering characteristic in minutely steering at on-center with a simple control configuration on the basis of a column angle or a steering wheel angle serving as steering angle information, suppresses frictional feeling, and improves linear steering feeling at on-center, and a control apparatus that determines a parameter set to the electric power steering apparatus.

Means for Solving the Problems

The present invention relates to an electric power steering apparatus that calculates a current command value by using an assist map related to a steering torque and a vehicle speed, drives a motor based on the current command value, and assists and controls a steering system comprising a torsion bar in a column shaft, the above-described object of the present invention is achieved by that comprising: a function of detecting a steering wheel angle and a column angle as steering angle information; and a SAT compensating-cum-virtual spring compensating section that calculates a SAT compensation-cum-virtual spring torque corresponding to the column angle or the steering wheel angle based on both the column angle or the steering wheel angle and the vehicle speed by using a SAT compensation-cum-virtual spring constant, and outputs a compensation signal to which the SAT compensation-cum-virtual spring torque is converted in accordance with a current conversion coefficient; wherein an inclination Kmap' from an origin of the assist map can be changed; and wherein the electric power steering apparatus compensates the current command value in accordance with the compensation signal, and gets a desired characteristic of on-center feeling.

The above-described object of the present invention is achieved by that wherein the SAT compensating-cum-virtual spring compensating section calculates the SAT compensation-cum-virtual spring torque by using the SAT compensation-cum-virtual spring constant that is derived by using a basic relational expression between the column angle or the steering wheel angle and a torsion bar torque, the basic relational expression being derived based on an approximate relational expression in gently steering, a first relational expression between the torsion bar torque and a torsion bar twist angle with a twist angle coefficient, a second relational expression between the column angle or the steering wheel angle and a SAT value with a SAT coefficient, a third relational expression between an assist torque and the torsion bar torque with an inclination Kmap of the assist map, and a fourth relational expression between the SAT compensation-cum-virtual spring torque and the column angle or the steering wheel angle with the SAT compensation-cum-virtual spring constant; or wherein when expressing the basic relational expression by setting the steering angle information on a horizontal axis and setting the steering torque on a vertical axis, the electric power steering apparatus obtains an inclination α of the steering torque to the steering angle information of the horizontal axis and an intercept Tr of the vertical axis, and derives the inclination Kmap and the SAT compensation-cum-virtual spring constant based on the inclination α and the intercept Tr; or wherein the SAT compensating-cum-virtual spring compensating section comprises a gain section, a phase compensating section, and a conversion coefficient section; or wherein the steering angle information is between ±30 deg.; or wherein the SAT compensating-cum-virtual spring compensating section sets the inclination Kmap' by using an inclination conversion coefficient and the inclination Kmap; or wherein the inclination Kmap' is changed depending on the vehicle speed.

Further, the present invention relates to control apparatus for controlling an electric power steering apparatus that assists and controls a steering system comprising a torsion bar in a column shaft by using an assist map related to a steering torque and a vehicle speed, the above-described object of the present invention is achieved by that comprising: a control parameter calculating section that calculates a SAT compensation-cum-virtual spring coefficient set to a SAT compensating-cum-virtual spring compensating section that the electric power steering apparatus comprises and an initial inclination set to the assist map, the SAT compensating-cum-virtual spring compensating section outputting a compensation signal to which a SAT compensation-cum-virtual spring torque calculated based on steering angle information and the vehicle speed is converted in accordance with a current conversion coefficient. conversion coefficient.

Effects of the Invention

The electric power steering apparatus according to the present invention calculates the current command value by using the vehicle speed as a parameter depending on the steering torque, comprises the assist map where the inclination from the origin can be changed and the SAT compensating-cum-virtual spring compensating section that uses both the vehicle speed and the column angle (a column output side angle) or both the vehicle speed and the steering wheel angle (a column input side angle), and compensates the current command value by means of the compensation signal of the SAT compensation-cum-virtual spring torque. This achieves a desired steering characteristic (a minute and slow steering region) in gently steering at on-center.

A control configuration is simple, and it is possible to suppress frictional feeling in the minute and slow steering region and improve linear steering feeling at on-center.

Further, the control apparatus according to the present invention sets the control parameter enabling the desired minute and slow steering region in minutely steering at on-center to the electric power steering apparatus that calculates the current command value by using the vehicle speed as a parameter depending on the steering torque, comprises the assist map where the inclination from the origin can be changed and the SAT compensating-cum-virtual spring compensating section that uses the vehicle speed and the steering angle information, and compensates the current command value by means of the compensation signal of the SAT compensation-cum-virtual spring torque. This control parameter achieves the electric power steering apparatus that has a desired steering characteristic, suppresses the frictional feeling in the minute and slow steering region, and improves the linear steering feeling at on-center.

BRIEF DESCRIPTION OF THE DRAWINGS

In the accompanying drawings.

MODE FOR CARRYING OUT THE INVENTION

The present invention is an electric power steering apparatus that achieves a desired steering characteristic in minutely steering (gently steering) at on-center (in the vicinity of a neutral position) with a simple control configuration, suppresses frictional feeling more than before, and improves linear steering feeling at on-center. The present invention achieves the desired steering characteristic (a minute and slow steering region) in gently steering at on-center by calculating a current command value by using a vehicle speed as a parameter depending on a steering torque; comprising an assist map where an inclination from an origin can be changed, and a SAT compensating-cum-virtual spring compensating section that calculates a compensation signal for performing SAT compensation-cum-virtual spring compensation on the basis of both the vehicle speed and a column angle (a column output side angle) serving as steering angle information or both the vehicle speed and a steering wheel angle (a column input side angle) serving as the steering angle information; and compensating the current command value by means of the compensation signal.

Further, a control apparatus according to the present invention achieves the desired steering characteristic in gently steering at on-center with a simple control configuration, suppresses the frictional feeling more than before, and improves the linear steering feeling at on-center. The control apparatus can simply tune on-center feeling by calculating and setting an initial inclination of the assist map and a SAT compensation-cum-virtual spring coefficient set to the SAT compensating-cum-virtual spring compensating section as a control parameter.

Hereinafter, an embodiment of the present invention will be described in detail with reference to the accompanying drawings.

Figure 1:
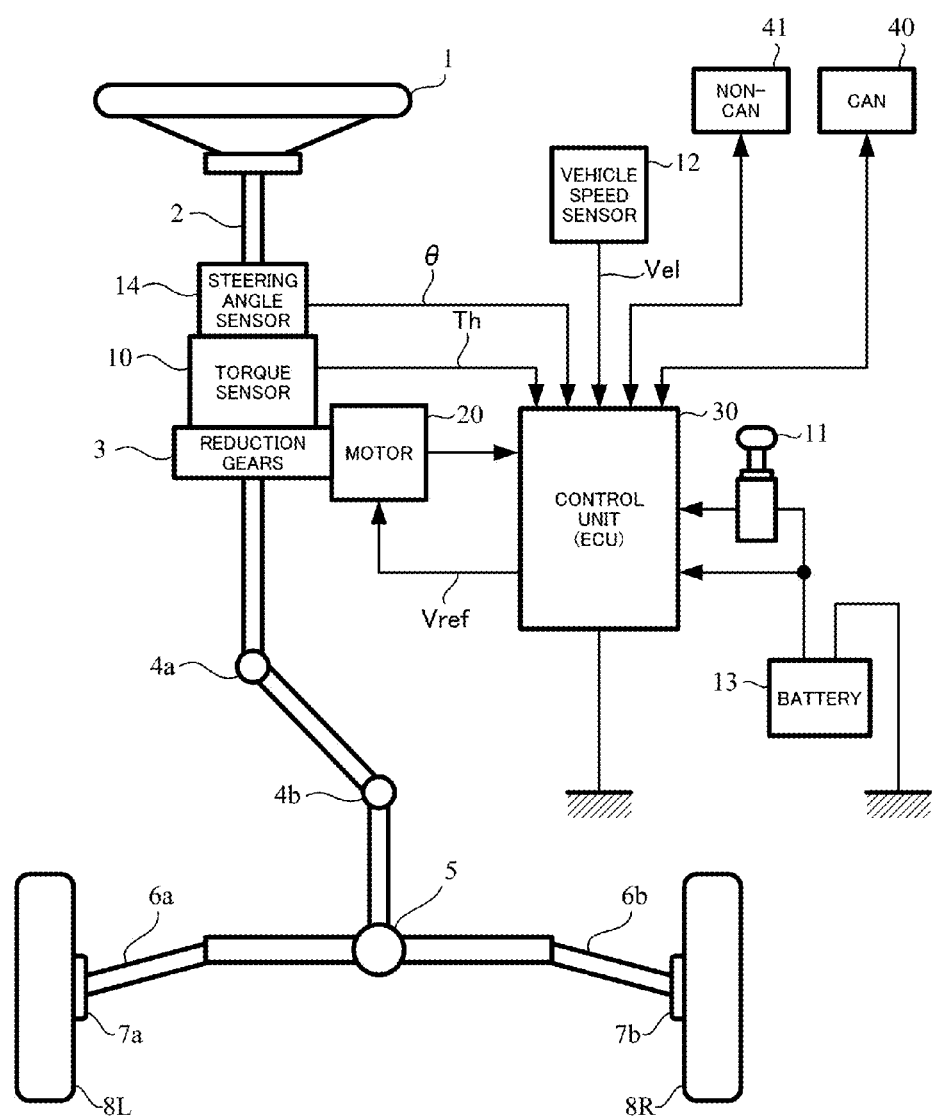
FIG. 1 is a configuration diagram illustrating a general outline of an electric power steering apparatus.
Figure 2:
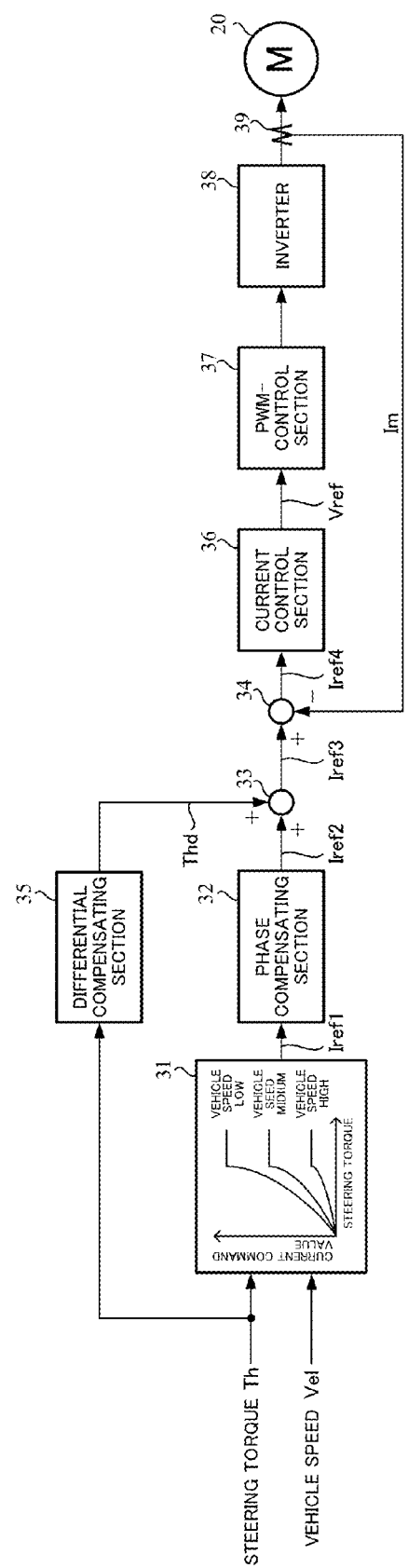
FIG. 2 is a block diagram showing a configuration example of a control system of the electric power steering apparatus.
Figure 3:
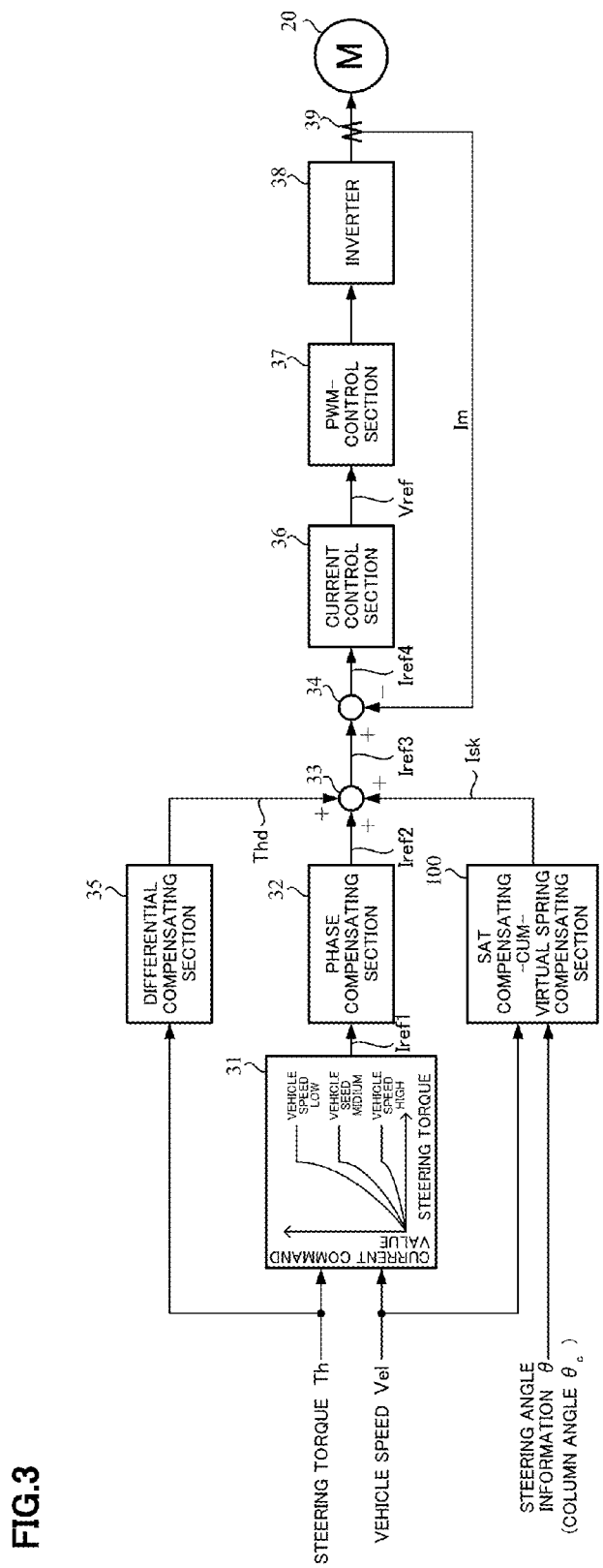
FIG. 3 is a block diagram showing a configuration example (a first embodiment) of the present invention.

FIG. 3 shows a configuration example (a first embodiment) of the present invention as corresponding to FIG. 2, which comprises a SAT compensating-cum-virtual spring compensating section 100 that inputs a vehicle speed Vel and a column angle θc serving as a steering angle information θ, and outputs a compensation signal Isk. The compensation signal Isk calculated in the SAT compensating-cum-virtual spring compensating section 100 is inputted into an adding section 33, where addition is performed and a current command value Iref2 is compensated. A motor 20 is driven by means of a current command value Iref3 obtained by performing SAT compensation-cum-virtual spring compensation.

Figure 4:
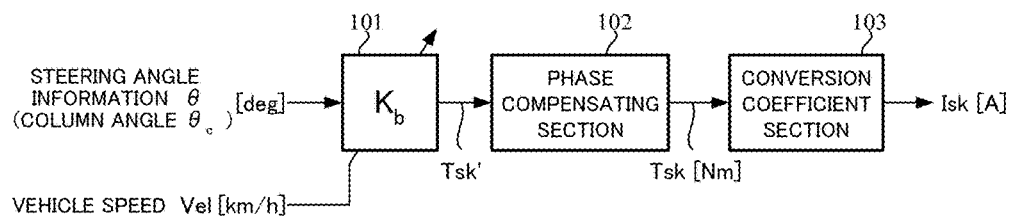
FIG. 4 is a block diagram showing a configuration example of a SAT compensating-cum-virtual spring compensating section according to the present invention.

The SAT compensating-cum-virtual spring compensating section 100 is configured, for example, as shown in FIG. 4. The steering angle information θ (the column angle θc) is inputted into a gain section 101 being vehicle speed sensitive, and a virtual spring torque Tsk' [Nm] obtained by multiplication of a SAT compensation-cum-virtual spring constant Kb is inputted into a phase compensating section 102 for widening range of turning. The phase compensating section 102 calculates a phase-compensated virtual spring torque Tsk [Nm] on the basis of the virtual spring torque Tsk' [Nm]. The calculated virtual spring torque Tsk is inputted into a conversion coefficient section 103 for converting it into a motor current [A], and the compensation signal Isk obtained by converting the virtual spring torque Tsk into a current value by means of a current conversion coefficient, is outputted.

Figure 5:
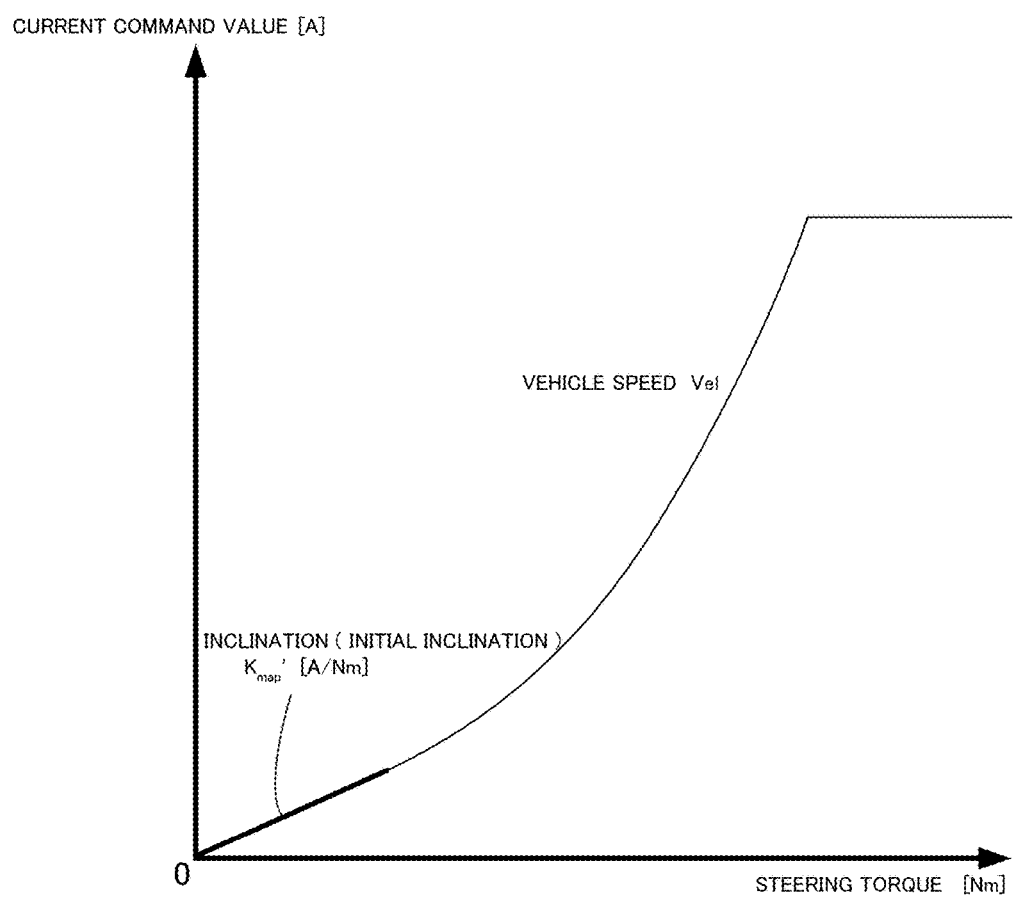
FIG. 5 is a characteristic diagram showing an example of an assist map according to the present invention.

The present invention sets an inclination from an origin of an assist map in a current command value calculating section 31 on an inclination Kmap' as shown in FIG. 5. The present invention defines Ci as an inclination conversion coefficient from a column shaft torque [Nm] to the motor current [A], and sets the inclination Kmap' in accordance with the following expression 1 by using an inclination Kmap used in the expression 6 described below. The inclination Kmap' is inputted into the current command value calculating section 31, and is adjusted to the inclination Kmap' from the origin of the assist map. The inclination Kmap' is changed depending on the vehicle speed Vel.

$$K\text{map}' = K\text{map}' Ci \qquad \text{[Expression 1]}$$

Figure 6:
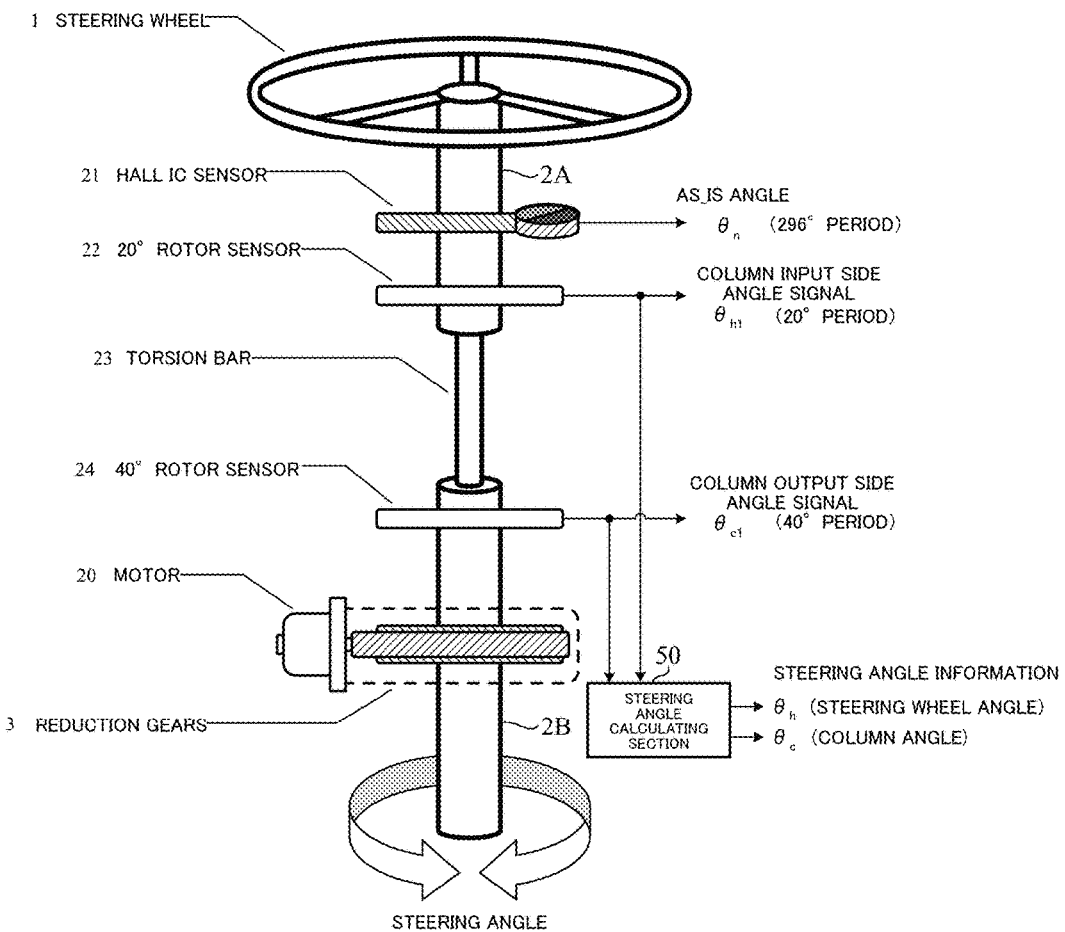
FIG. 6 is a schematic diagram showing a relationship between an example of mounting sensors and steering angle information.

In an electric power steering apparatus comprising a torsion bar in a column shaft (a handle shaft) 2, for example, various sensors shown in FIG. 6 are mounted on the column shaft 2 where a torsion bar 23 is inserted, and angles are detected. That is, a Hall IC sensor 21 as an angle sensor and a 20° rotor sensor 22 on a torque sensor input side rotor are mounted on an input shaft 2A of a steering wheel 1 side of the handle shaft 2. The Hall IC sensor 21 outputs an AS_IS angle θn of 296° period. The 20° rotor sensor 22 that is mounted on a side closer to the steering wheel 1 than the torsion bar 23, outputs a column input side angle signal θh1 of 20° period, and the column input side angle signal θh1 is inputted into a steering angle calculating section 50. Further, a 40° rotor sensor 24 on a torque sensor output side rotor is mounted on an output shaft 2B of the handle shaft 2, a column output side angle signal θc1 is outputted from the 40° rotor sensor 24, and the column output side angle signal θc1 is inputted into the steering angle calculating section 50. The column input side angle signal θh1 and the column output side angle signal θc1 that serve as the steering angle information are calculated as absolute angles in the steering angle calculating section 50, and a steering wheel angle θh and a column angle θc that are absolute angles, are outputted as the steering angle information from the steering angle calculating section 50. The column θc detected in this way is inputted into the SAT compensating-cum-virtual spring compensating section 100.

Here, in the case that Tt is defined as a torsion bar torque, ωc is defined as a column angular velocity, Ta is defined as an assist torque corresponding to the detected torsion bar torque Tt, Tb is defined as a SAT compensation-cum-virtual spring torque corresponding to the column angle θc, Tsat is defined as a detected or estimated self-aligning torque (SAT) value, and Tf is defined as a friction torque, a relational expression in relatively slowly or gently steering (hereinafter referred to "gently steering") is approximately expressed by the following expression 2. The expression 2, hereinafter, is referred to a "first approximate relational expression in gently steering".

$$T_t + T_a(T_t) - T_b(\theta_c) = T_{sat}(\theta_c) + T_f \mathrm{sign}(\omega_c) \quad [\text{Expression 2}]$$

Figure 7:
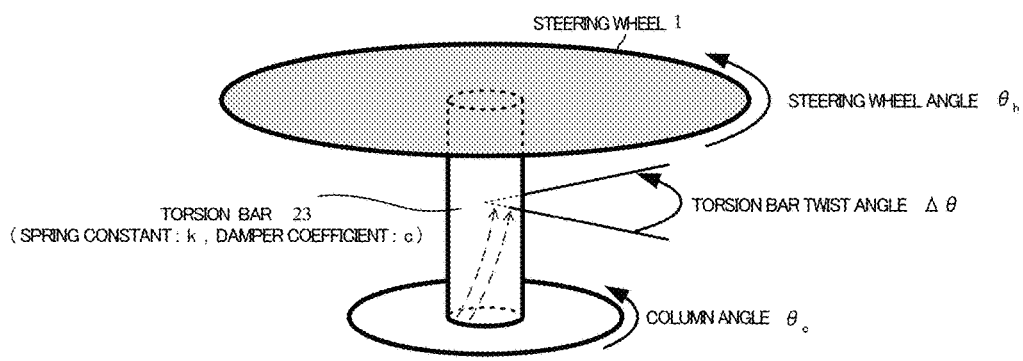
FIG. 7 is a mechanical diagram showing a relationship between a torsion bar and the steering angle information.

A relationship of a torsion bar twist angle Δθ, the steering wheel angle θh and the column angle θc becomes as shown in FIG. 7, and the following expression 3 holds.

$$\theta_c = \theta_h - \Delta\theta \quad [\text{Expression 3}]$$

A relationship between the torsion bar torque Tt and the torsion bar twist angle Δθ is expressed with defining Kt as a twist angle coefficient by a relational expression of the following expression 4.

$$T_t = K_t \Delta\theta \quad [\text{Expression 4}]$$

In the case that a relationship between the column angle θc and the SAT value Tsat is proportional, a relational expression of the following expression 5 holds with defining Ksat as a SAT coefficient.

$$T_{sat}(\theta_c) = K_{sat} \theta_c \quad [\text{Expression 5}]$$

Further, in the case that the assist torque Ta is expressed as proportional to the detected torsion bar torque Tt, a relational expression of the following expression 6 holds with defining Kmap as the inclination.

$$T_a(T_t) = K_{map} T_t \quad [\text{Expression 6}]$$

In the case that the SAT compensation-cum-virtual spring torque Tb is expressed as proportional to the column angle θc, a relational expression of the following expression 7 holds with defining Kb as the SAT compensation-cum-virtual spring constant.

$$T_b(\theta_c) = K_b \theta_c = T_{sk}' \quad [\text{Expression 7}]$$

From the above relational expressions, a relational expression between the column angle θc and the torsion bar torque Tt is derived as the following expression 8.

$$T_t = \frac{K_t}{K_t(K_{map}+1)+(K_b+K_{sat})}\{(K_b+K_{sat})\theta_h + T_f \mathrm{sign}(\omega_c)\} \quad [\text{Expression 8}]$$

Figure 8:
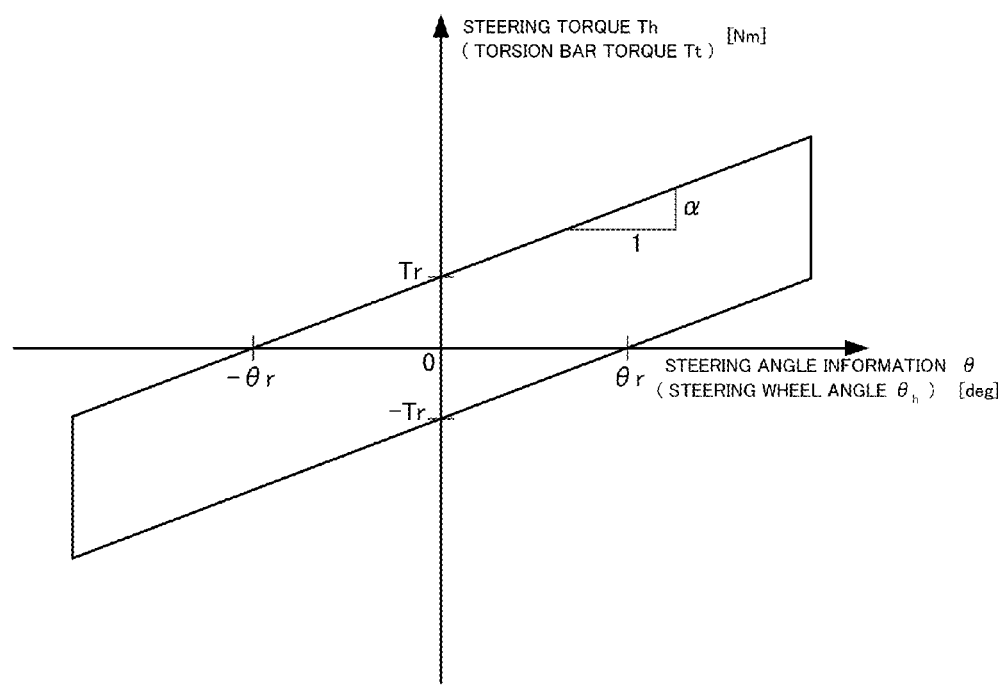
FIG. 8 is a characteristic diagram showing a relationship between a steering angle (a column angle) and a steering torque (a torsion bar torque) schematically.

From the above expression 8, the steering angle information θ (the steering wheel angle θh) [deg] and the steering torque (the torsion bar torque Tt) [Nm] are schematically expressed as shown in FIG. 8. The X-axis (the horizontal axis) shows the steering wheel angle θh [deg], and the Y-axis (the vertical axis) shows the torsion bar torque Tt [Nm]. An intercept Tr [Nm] with the Y-axis and an inclination α [Nm/deg] of a steering torque to the steering wheel angle θh [deg] are expressed by the following expressions 9 and 10.

$$T_r = \frac{K_t T_f}{K_t(K_{map}+1)+(K_b+K_{sat})} \quad [\text{Expression 9}]$$

$$\alpha = \frac{K_t(K_b+K_{sat})}{K_t(K_{map}+1)+(K_b+K_{sat})} \quad [\text{Expressison 10}]$$

Next, the inclination Kmap is derived as the following expression 11 from the desired torsion bar torque Tt and the desired inclination α of the steering torque, and the SAT compensation-cum-virtual spring constant Kb is expressed as the following expression 12.

$$K_{map} = \frac{T_f}{T_r} - \frac{K_t + K_b + K_{sat}}{K_t} \quad [\text{Expression 11}]$$

$$K_b = \alpha \frac{T_f}{T_r} - K_{sat} \quad [\text{Expression 12}]$$

In such a configuration, an operating example will be described with reference to a flowchart in FIG. 9.

First, a detected steering torque Th is inputted (Step S1), next, the vehicle speed Vel is inputted (Step S2), and the steering wheel angle θh and the column angle θc are inputted (Step S3). The order of these inputs can be changed appropriately. The gain section 101 obtains the virtual spring torque Tsk' on the basis of the column angle θc and the vehicle speed Vel (Step S10), and the phase compensating section 102 calculates the virtual spring torque Tsk on the basis of the virtual spring torque Tsk' (Step S20).

The virtual spring torque Tsk from the phase compensating section 102 is inputted into the conversion coefficient section 103, is multiplied by the current conversion coefficient which is used for converting to a current, and the compensation signal Isk is outputted (Step S30). After that, the current command value calculating section 31 calculates a current command value Iref1 by using the assist map having the inclination Kmap' (Step S41). The compensation signal Isk from the conversion coefficient section 103 is inputted into the adding section 33, and the current command value Iref2 is compensated by the compensation signal Isk (Step S42).

Figure 10:
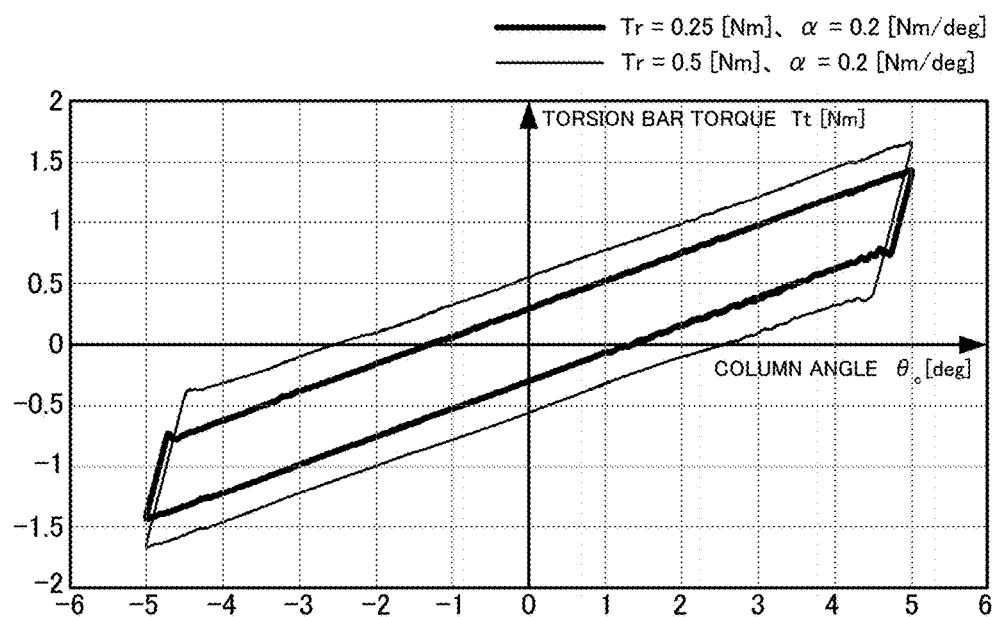
FIG. 10 is a characteristic diagram showing a simulation result of the present invention (the first embodiment)

A simulation result of the first embodiment considering a vehicle model and an electric power steering apparatus is shown in FIG. 10. FIG. 10 shows a diagram of the column angle θc and the torsion bar torque Tt in the case of steering at 0.2 Hz with a vehicle speed of 100 kph and a steering wheel angle of 5 deg. The thin line and the thick line respectively show the cases of applying an initial inclination Kmap' [A/Nm] of the assist map and the SAT compensation-cum-virtual spring constant Kb [Nm/deg] that are obtained when setting the following values on the intercept Tr and the inclination α;

the thin line: Tr=0.5[Nm], α=0.2[Nm/deg], the thick line: Tr=0.25[Nm], α=0.2[Nm/deg].

The first embodiment of the present invention inversely calculates the inclination Kmap and the SAT compensation-cum-virtual spring constant Kb from a desired characteristic (the intercept Tr and the inclination α) as shown in FIG. 10. The SAT compensation-cum-virtual spring constant Kb and the inclination Kmap are obtained in advance, and, for example, a map whose characteristic depends on a vehicle speed may be used. Further, the column angle may be detected by an angle sensor detecting the column angle directly, or may be obtained by combining the torsion bar twist angle with the steering wheel angle.

Next, a second embodiment that uses the steering wheel angle (the column output side angle) θh as the steering angle information, will be described.

Figure 11:
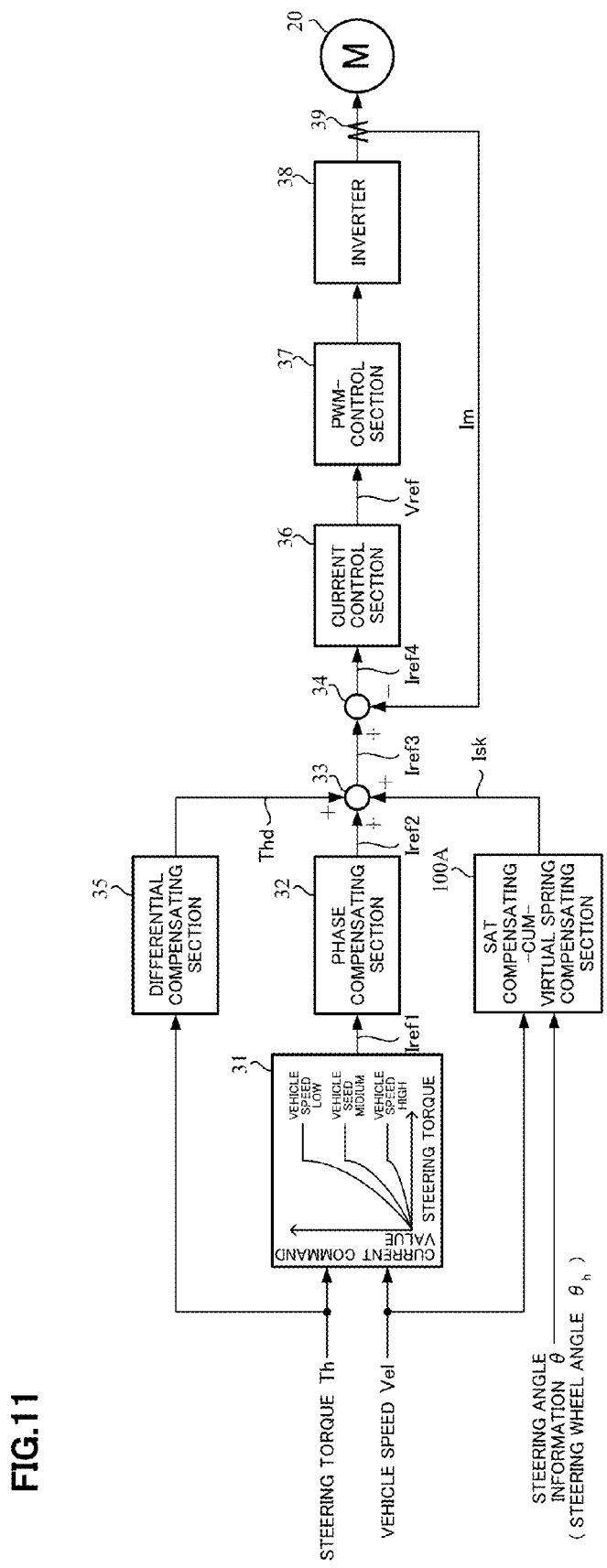
FIG. 11 is a block diagram showing a configuration example (a second embodiment) of the present invention.
Figure 12:
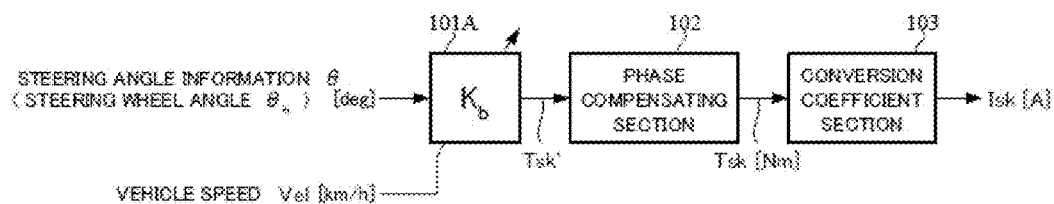
FIG. 12 is a block diagram showing a configuration example of the SAT compensating-cum-virtual spring compensating section according to the present invention.

Its configuration is shown in FIG. 11 as corresponding to FIG. 3, the vehicle speed Vel and the steering wheel angle θh serving as the steering angle information are inputted into a SAT compensating-cum-virtual spring compensating section 100A, and the compensation signal Isk is inputted into the adding section 33. A detailed configuration of the SAT compensating-cum-virtual spring compensating section 100A is shown in FIG. 12 as corresponding to FIG. 4, the steering wheel angle θh is inputted into a gain section 101A being vehicle speed sensitive, and the virtual spring torque Tsk' [Nm] obtained by multiplication of the SAT compensation-cum-virtual spring constant Kb is inputted into the phase compensating section 102.

In the second embodiment, the relational expression in gently steering is approximately expressed by the following expression 13 with respect to the torsion bar torque Tt, the column angular velocity ωc, the assist torque Ta, the SAT compensation-cum-virtual spring torque Tb, the SAT value Tsat, and the friction torque Tf. The expression 13, hereinafter, is referred to a "second approximate relational expression in gently steering".

$$T_t + T_a(T_t) - T_b(\theta_h) = T_{sat}(\theta_c) + T_f \text{sign}(\omega_c) \quad \text{[Expression 13]}$$

Also in the second embodiment, the relationship of the torsion bar twist angle Δθ, the steering wheel angle θh and the column angle θc becomes as shown in FIG. 7, the above expression 3 holds, and the relationship between the torsion bar torque Tt and the torsion bar twist angle Δθ is expressed by the above expression 4. Similarly, in the case that a relationship between the steering wheel angle θh and the SAT value Tsat is proportional, the relational expression of the above expression 5 holds, and in the case that the assist torque Ta is expressed as proportional to the detected torsion bar torque Tt, the relational expression of the above expression 6 holds. Then, in the case that the SAT compensation-cum-virtual spring torque Tb is expressed as proportional to the steering wheel angle θh, a relational expression of the following expression 14 holds.

$$T_b(\theta_h) = K_b \theta_h = T_{sk}' \quad \text{[Expression 14]}$$

From the above relational expressions, a relational expression between the steering wheel angle θh and the torsion bar torque Tt is derived as the following expression 15.

$$T_t = \frac{K_t}{K_t(K_{map}+1)+K_{sat}}\{(K_b+K_{sat})\theta_h + T_f \text{sign}(\omega_c)\} \quad \text{[Expression 15]}$$

From the above expression 15, the steering angle information (the steering wheel angle θh) [deg] and the steering torque (the torsion bar torque Tt) [Nm] are schematically expressed as shown in FIG. 8, however, in the second embodiment, the intercept Tr [Nm] with the Y-axis and the inclination α [Nm/deg] of the steering torque to the steering wheel angle θh are expressed by the following expressions 16 and 17.

$$T_r = \frac{K_t T_f}{K_t(K_{map}+1)+K_{sat}} \quad \text{[Expression 16]}$$

$$\alpha = \frac{K_t(K_b+K_{sat})}{K_t(K_{map}+1)+K_{sat}} \quad \text{[Expression 17]}$$

Next, the inclination Kmap is derived as the following expression 18 from the desired torsion bar torque Tt and the desired inclination α of the steering torque, and the SAT compensation-cum-virtual spring constant Kb is expressed as the above expression 12.

$$K_{map} = \frac{T_f}{T_r} - \frac{K_t + K_{sat}}{K_t} \quad \text{[Expression 18]}$$

Figure 9:
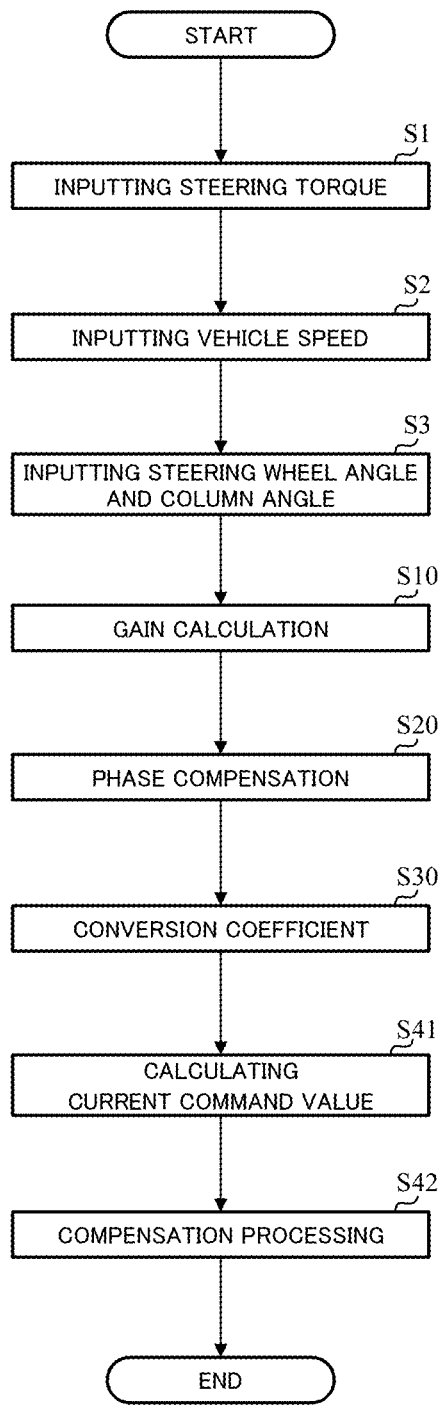
FIG. 9 is a flowchart showing an operating example of the present invention.

In such a configuration, an operating example is the same as the flowchart shown in FIG. 9, however, only the step (Step S10) where the gain section 101A obtains the virtual spring torque Tsk' on the basis of the steering wheel angle θh and the vehicle speed Vel, is different from the first embodiment.

Figure 13:
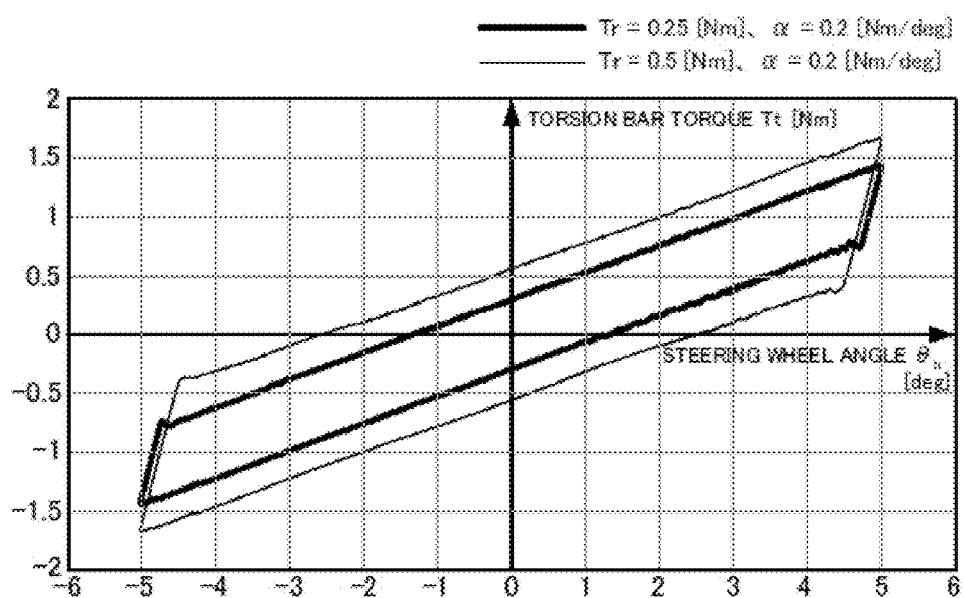
FIG. 13 is a characteristic diagram showing a simulation result of the present invention (the second embodiment)

A simulation result of the second embodiment considering the vehicle model and the electric power steering apparatus is shown in FIG. 13. FIG. 13 shows a diagram of the steering wheel angle θh and the torsion bar torque Tt in the case of steering at 0.2 Hz with the vehicle speed of 100 kph and the steering wheel angle of 5 deg. The thin line and the thick line respectively show the cases of applying the initial inclination Kmap' [A/Nm] of the assist map and the SAT compensation-cum-virtual spring constant Kb [Nm/deg] that are obtained when setting the following values on the intercept Tr and the inclination α;

the thin line: Tr=0.5[Nm], α=0.2[Nm/deg], the thick line: Tr=0.25[Nm], α=0.2[Nm/deg].

The present invention inversely calculates the inclination Kmap and the SAT compensation-cum-virtual spring constant Kb from the desired characteristic (the intercept Tr and the inclination α) as shown in FIG. 13. The SAT compensation-cum-virtual spring constant Kb and the inclination Kmap are obtained in advance, and, for example, a map whose characteristic depends on a vehicle speed may be used.

Further, the steering wheel angle may be detected by an angle sensor detecting the steering wheel angle directly, may be an angle obtained from a relationship between a motor angle and a reduction ratio, or may be an angle obtained from the column angle and the torsion bar twist angle. The torsion bar twist angle may be detected by a torsion bar torque sensor detecting the twist angle directly, or may be an angle obtained from a deviation between the steering wheel angle and the column angle.

Here, by setting the initial inclination of the assist map which the current command value calculating section in the electric power steering apparatus uses on the Kmap' as shown in FIG. 5, and using the inclination conversion coefficient Ci, the initial inclination Kmap' is calculated in accordance with the above expression 1. Therefore, the friction torque Tf, the twist angle coefficient Kt, the SAT coefficient Ksat and the inclination conversion coefficient Ci are known, the desired intercept Tr and the desired inclination α are set, so that it is possible to obtain the initial inclination Kmap' of the assist map and a SAT compensation-cum-virtual spring coefficient Kb by using the expressions 11, 12 and 19 in the case of using the column angle θc, and by using the expressions 11, 18 and 19 in the case of using the steering wheel angle θh. Moreover, since the initial inclination Kmap' and the SAT compensation-cum-virtual spring coefficient Kb are changed depending on the vehicle speed Vel, the initial inclination Kmap' and the SAT compensation-cum-virtual spring coefficient Kb are obtained at each of a plurality of preset vehicle speeds (hereinafter referred to "set vehicle speeds") Vs.

An electric power steering apparatus that a control apparatus according to the present invention controls, will be described.

Figure 14:
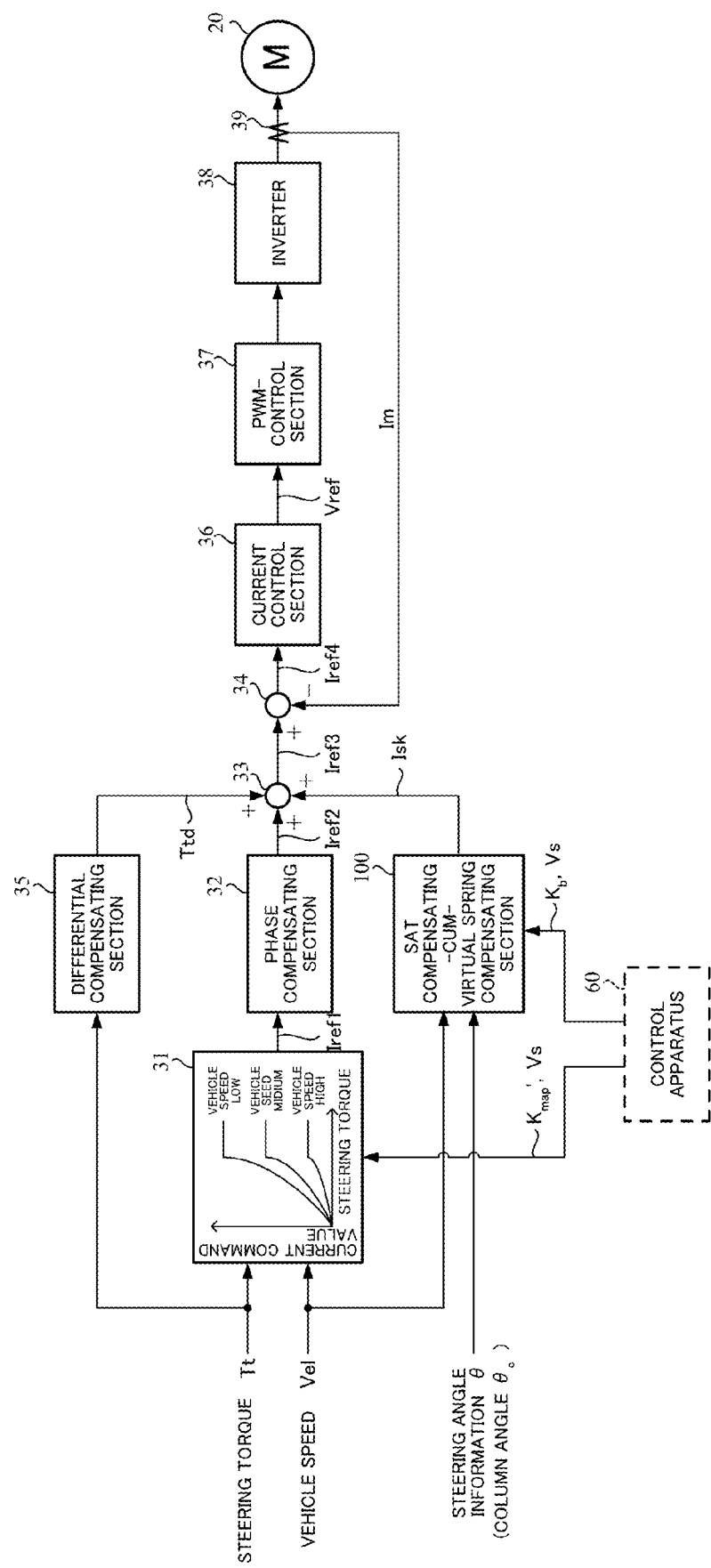
FIG. 14 is a block diagram showing a configuration example of an electric power steering apparatus that a control apparatus (a third embodiment) according to the present invention controls.

FIG. 14 shows a configuration example (a third embodiment) of the electric power steering apparatus that the control apparatus according to the present invention controls as corresponding to FIG. 2 and FIG. 3. The present example uses the column θc as the steering angle information, and is provided with the SAT compensating-cum-virtual spring compensating section 100 that inputs the vehicle speed Vel and the column θc, and outputs the compensation signal Isk. The compensation signal Isk calculated in the SAT compensating-cum-virtual spring compensating section 100 is inputted into the adding section 33, where the addition is performed, and the current command value Iref2 is compensated. The motor 20 is driven by means of the current command value Iref3 obtained by performing SAT compensation-cum-virtual spring compensation. The initial inclination Kmap' of the assist map and the SAT compensation-cum-virtual spring coefficient Kb that are calculated in a control apparatus 60, are respectively set to the current command value calculating section 31 and the SAT compensating-cum-virtual spring compensating section 100 along with the set vehicle speeds Vs.

Figure 15:
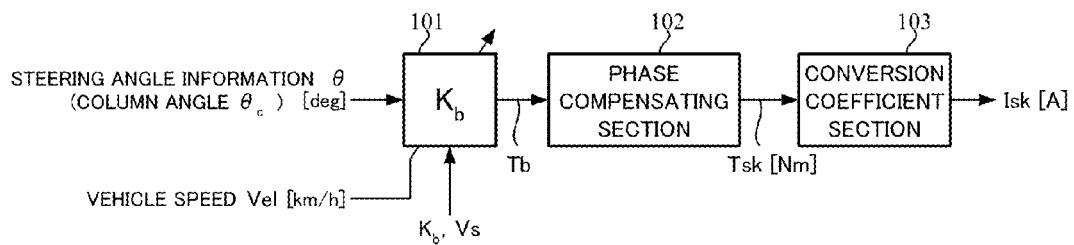
FIG. 15 is a block diagram showing a configuration example of the SAT compensating-cum-virtual spring compensating section.

The SAT compensating-cum-virtual spring compensating section 100 is configured, for example, as shown in FIG. 15. The column θc is inputted into the gain section 101 which is vehicle speed sensitive and to which the SAT compensation-cum-virtual spring coefficient Kb calculated in the control apparatus 60 is set, the SAT compensation-cum-virtual spring torque Tb [Nm] obtained by multiplication of the SAT compensation-cum-virtual spring coefficient Kb is inputted into the phase compensating section 102. The phase compensating section 102 calculates the phase-compensated virtual spring torque Tsk [Nm]. The virtual spring torque Tsk is inputted into the conversion coefficient section 103, and the compensation signal Isk obtained by converting the virtual spring torque Tsk into a current value is outputted.

In an electric power steering apparatus comprising the torsion bar in the column shaft (the handle shaft) 2, for example, various sensors shown in FIG. 6 are mounted on the column shaft 2 where the torsion bar 23 is inserted, and angles are detected. The detected column θc is inputted into the SAT compensating-cum-virtual spring compensating section 100.

In an electric power steering apparatus having such a configuration, an operating example is shown as a flowchart in FIG. 9. In the calculation of the SAT compensation-cum-virtual spring torque Tb (Step S10) and the calculation of the current command value Iref1 (Step S41), when there is nothing to correspond to the vehicle speed Vel among the set vehicle speeds Vs, the SAT compensation-cum-virtual spring coefficient Kb and the initial inclination Kmap' at the set vehicle speed which is closest to the vehicle speed Vel, are used. A configuration and an operation in the case of using the steering wheel angle θh as the steering angle information are the same as the above configuration example and the above operating example.

As described above, the control apparatus according to the present invention calculates the initial inclination Kmap' and the SAT compensation-cum-virtual spring coefficient Kb that are set to the current command value calculating section 31 and the SAT compensating-cum-virtual spring compensating section 100.

Hereinafter, an example of the control apparatus (the third embodiment) according to the present invention will be described with reference to the accompanying drawings.

Figure 16:
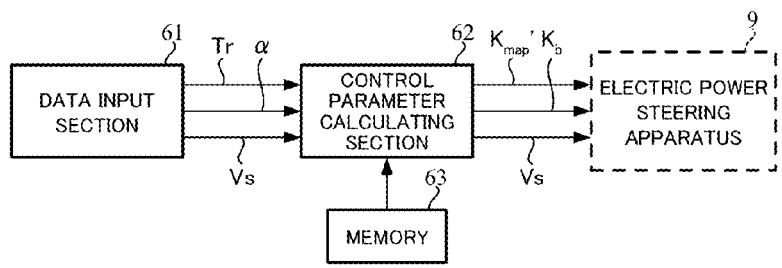
FIG. 16 is a block diagram showing a configuration example (a first example) of the present invention.

FIG. 16 is a block diagram showing a first example of the present invention. In the first example, the control apparatus 60 comprises a data input section 61, a control parameter calculating section 62 and a memory 63.

The data input section 61 has a keyboard, a tablet or the like, and acquires the intercept Tr and the inclination α of the desired steering characteristic, and the set vehicle speeds Vs. The friction torque Tf, the twist angle coefficient Kt, the SAT coefficient Ksat and the inclination conversion coefficient Ci (hereinafter referred to "characteristic composition data" together) are stored in the memory 63. The control parameter calculating section 62 calculates control parameters (the initial inclination Kmap' and the SAT compensation-cum-virtual spring coefficient Kb) at the set vehicle speeds Vs by using the intercept Tr and the inclination α of the desired steering characteristic, and the characteristic composition data stored in the memory 63.

Figure 17:
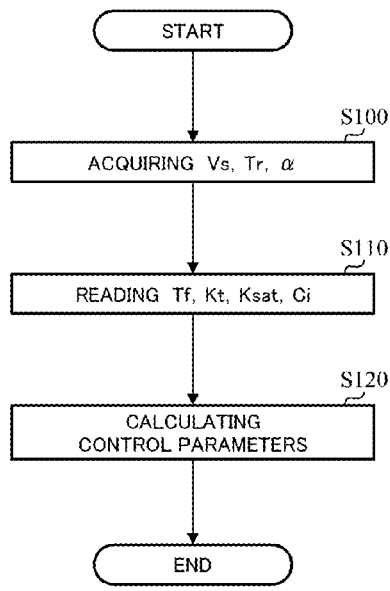
FIG. 17 is a flowchart showing an operating example (the first example) of the present invention.

In such a configuration, an operating example (the first example) will be described with reference to a flowchart in FIG. 17.

First, the data input section 61 acquires the set vehicle speeds Vs, and the intercept Tr and the inclination α of the desired steering characteristic, and outputs them to the control parameter calculating section 62 (Step S100). The control parameter calculating section 62 reads the characteristic composition data (Tf, Kt, Ksat and Ci) stored in the memory 63 (Step S110), and calculates the initial inclination Kmap' and the SAT compensation-cum-virtual spring coefficient Kb by using the inputted intercept Tr and the inputted inclination α (Step S120). In the calculation, the control parameter calculating section 62 uses the expressions 10, 11 and 12 when using the column θc as a steering angle, and uses the expressions 11, 12 and 18 when using the steering wheel angle θh as a steering angle.

The calculated initial inclination Kmap' and the calculated SAT compensation-cum-virtual spring coefficient Kb are set to an electric power steering apparatus 9 as the control parameters at the set vehicle speeds Vs.

A simulation result using the control parameter calculated in the control apparatus according to the present invention, and considering the vehicle model and the electric power steering apparatus, is the same as shown in FIG. 13.

Though the above first example calculates only the control parameter, the control apparatus 60 may calculate a parameter used in the phase compensating section 102 of the SAT compensating-cum-virtual spring compensating section 100 in the electric power steering apparatus 9. For example, when the phase compensating section 102 achieves the phase compensation with a primary filter, the control apparatus 60 calculates filter coefficients by setting cut-off frequencies of a numerator and a denominator of a transfer function. In this case, the cut-off frequencies are acquired by the data input section 61. Herewith, it is possible to calculate parameters necessary to operation of the electric power steering apparatus 9 together.

Though the first example calculates only the control parameters at the set vehicle speeds, it is possible to calculate a control parameter at a vehicle speed other than the set vehicle speeds by linear interpolation or the like. For example, a control parameter at a vehicle speed Vx other than the set vehicle speeds is calculated by linear interpolation from the control parameters at set vehicle speeds Vs(n) and Vs(n+1) that are positioned in the vicinity of the vehicle speed Vx among the set vehicle speeds. That is, in the case that the initial inclinations at the set vehicle speeds Vs(n) and Vs(n+1) are respectively Kmap'(n) and Kmap'(n+1) and the SAT compensation-cum-virtual spring coefficients at the set vehicle speeds Vs(n) and Vs(n+1) are respectively Kb(n) and Kb(n+1), an initial inclination Kmap'x and a SAT compensation-cum-virtual spring coefficient Kbx at the vehicle speed Vx are respectively calculated in accordance with the following expressions 19 and 20.

$$K'_{map\,x} = K'_{map}(n) + \frac{\{K'_{map}(n+1) - K'_{map}(n)\}(Vx - Vs(n))}{Vs(n+1) - Vs(n)} \quad \text{[Expression 19]}$$

$$K_{bx} = K_b(n) + \frac{\{K_b(n+1) - K_b(n)\}(Vx - Vs(n))}{Vs(n+1) - Vs(n)} \quad \text{[Expression 20]}$$

Herewith, it is possible to easily expand an applicable vehicle speed range.

Figure 18:
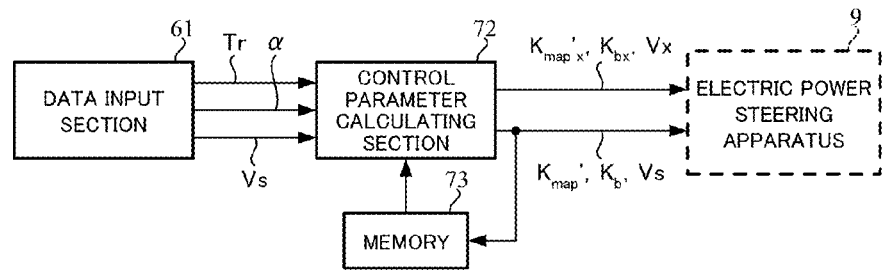
FIG. 18 is a block diagram showing a configuration example (a second example) of the present invention.

A second example of the present invention including this function is shown in FIG. 18. In the second example, the control parameter calculating section and the memory are changed as compared to the first example shown in FIG. 16. That is, a memory 73 stores the control parameters, which are calculated in a control parameter calculating section 72, at the set vehicle speeds Vs along with the set vehicle speeds Vs, in addition to the characteristic composition data. The control parameter calculating section 72 calculates also the control parameter at the vehicle speed Vx other than the set vehicle speeds Vs by using the control parameters at the set vehicle speeds Vs stored in the memory 73. Moreover, the vehicle speed Vx may be acquired by the data input section 61, may be predetermined, or may be calculated from the set vehicle speeds Vs (for example, by using an intermediate value between the set vehicle speeds as Vx, etc.).

Figure 19:
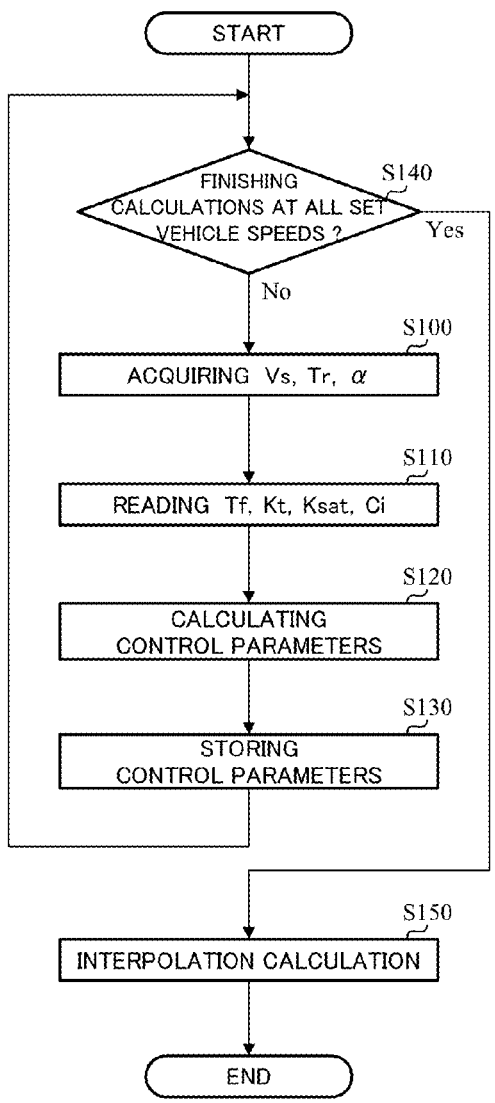
FIG. 19 is a flowchart showing an operating example (the second example) of the present invention.

An operating example of the second example will be described with reference to a flowchart in FIG. 19.

First, the initial inclination Kmap' and the SAT compensation-cum-virtual spring coefficient Kb at the set vehicle speed are calculated by the same operations as the first example (Steps S100 to S120). The calculated initial inclination Kmap', the calculated SAT compensation-cum-virtual spring coefficient Kb, and the set vehicle speed Vs are stored in the memory 73 (Step S130). When the initial inclinations Kmap' and the SAT compensation-cum-virtual spring coefficients Kb at all of the set vehicle speeds are calculated (Step S140), the control parameter calculating section 72 calculates the initial inclination Kmap'x and the SAT compensation-cum-virtual spring coefficient Kbx at the vehicle speed Vx other than the set vehicle speeds Vs using the Kmap', the Kb and the Vs stored in the memory 73 by linear interpolation in accordance with the expressions 19 and 20 (Step S150).

The calculated initial inclination Kmap'x and the calculated SAT compensation-cum-virtual spring coefficient Kbx are set to the electric power steering apparatus 9 as the control parameter at the vehicle speed Vx along with the initial inclinations Kmap' and the SAT compensation-cum-virtual spring coefficients Kb at the set vehicle speeds Vs.

Moreover, it is possible to calculate the control parameter at the vehicle speed Vx in the electric power steering apparatus 9. When the vehicle speed Vel that the electric power steering apparatus 9 inputs is not included in the set vehicle speeds Vs, for example, the current command value calculating section 31 calculates the initial inclination Kmap'x at the vehicle speed Vel by linear interpolation, and the SAT compensating-cum-virtual spring compensating section 100 calculates the SAT compensation-cum-virtual spring coefficient Kbx at the vehicle speed Vel by linear interpolation. Herewith, it is possible to calculate the control parameter corresponding to the actually measured vehicle speed.

Further, the control parameter at the vehicle speed Vx may be calculated by interpolation method other than linear interpolation. For example, it may be calculated by Lagrange interpolation, Newton's interpolation or the like being polynomial interpolation. Herewith, it is possible to enhance the precision of the interpolation calculation.

It is possible to intelligibly show the desired steering characteristic by providing the control apparatus according to the present invention with a display section and displaying a characteristic diagram figured from the intercept Tr and the inclination α that are acquired by the data input section 61.

Figure 20:
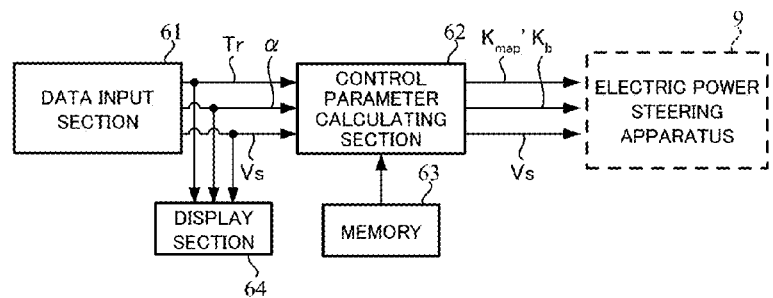
FIG. 20 is a block diagram showing a configuration example (a third example) of the present invention.

A third example configured by adding the display section to the first example shown in FIG. 16, is shown in FIG. 20. The intercept Tr, the inclination α and the set vehicle speed Vs that are outputted from the data input section 61, are inputted into the control parameter calculating section 62 and a display section 64.

Figure 21:
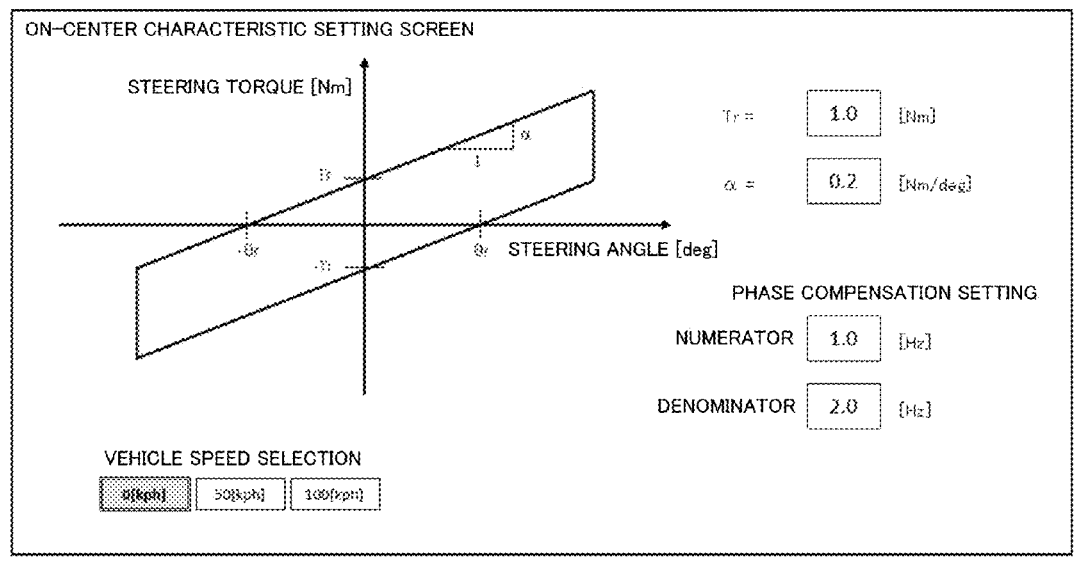
FIG. 21 is a screen diagram showing a display example of a display section of the third example.

A display example by the display section 64 is shown in FIG. 21. In the display example, the cut-off frequencies set in order to calculate the parameters used in the phase compensating section 102 of the SAT compensating-cum-virtual spring compensating section 100 in the electric power steering apparatus 9, also are displayed.

Moreover, the display section 64 may display also the initial inclination and the SAT compensation-cum-virtual spring coefficient that are calculated by the control parameter calculating section 62.

In the above first to third examples, the control apparatus 60 and the electric power steering apparatus 9 are connected. However, after the control parameters calculated by the control apparatus 60 are set to the electric power steering apparatus 9, the control apparatus 60 and the electric power steering apparatus 9 may be disconnected because the control apparatus 60 is unnecessary until resetting is needed. Alternatively, it is possible not to connect the control apparatus 60 and the electric power steering apparatus 9, for the control apparatus 60 to write the calculated control parameters to a detachable storage medium, and for the electric power steering apparatus 9 to read the control parameters from the storage medium.

EXPLANATION OF REFERENCE NUMERALS

1 steering wheel
2 column shaft (steering shaft, handle shaft)
10 torque sensor
12 vehicle speed sensor
13 battery
20 motor
36 current control section
37 PWM-control section
38 inverter
50 steering angle calculating section
60 control apparatus
63 memory
100, 100A SAT compensating-cum-virtual spring compensating section
101, 101A gain section
102 phase compensating section
103 conversion coefficient section

The invention claimed is:

1. An electric power steering apparatus that calculates a current command value by using an assist map defining a characteristic of said current command value to a steering torque depending on a vehicle speed, drives a motor based on said current command value, and assists and controls a steering system comprising a torsion bar in a column shaft, comprising:
   a function of detecting a steering wheel angle and a column angle as steering angle information; and
   a self-aligning torque (SAT) compensating virtual spring compensating section that calculates a SAT compensation-cum-virtual spring torque based on either said column angle and said vehicle speed, or said steering wheel angle and said vehicle speed by multiplying said column angle or said steering wheel angle by a SAT compensation-cum-virtual spring constant being vehicle speed sensitive, and outputs a compensation signal to which said SAT compensation-cum-virtual spring torque is converted in accordance with a current conversion coefficient;
   wherein an inclination Kmap' from an origin of said assist map can be changed;
   wherein said electric power steering apparatus compensates said current command value in accordance with said compensation signal; and
   wherein said inclination Kmap' and said SAT compensation-cum-virtual spring constant are set based on a parameter that defines a desired steering characteristic at on-center.

2. The electric power steering apparatus according to claim 1,
   wherein said SAT compensating virtual spring compensating section calculates said SAT compensation-cum-virtual spring torque by using said SAT compensation-cum-virtual spring constant that is derived by using a basic relational expression between said column angle or said steering wheel angle and a torsion bar torque, said basic relational expression being derived based on an approximate relational expression in minute and slow steering, a first relational expression between said torsion bar torque and a torsion bar twist angle with a twist angle coefficient, a second relational expression between said column angle or said steering wheel angle and a SAT value with a SAT coefficient, a third relational expression between an assist torque and said torsion bar torque with an inclination Kmap of said assist map, and a fourth relational expression between said SAT compensation-cum-virtual spring torque and said column angle or said steering wheel angle with said SAT compensation-cum-virtual spring constant.

3. The electric power steering apparatus according to claim 2,
   wherein when expressing said basic relational expression by setting said steering angle information on a horizontal axis and setting said steering torque on a vertical axis, said electric power steering apparatus obtains an inclination $\alpha$ of said steering torque to said steering angle information of said horizontal axis and an intercept Tr of said vertical axis, and derives said inclination Kmap and said SAT compensation-cum-virtual spring constant based on said inclination $\alpha$ and said intercept Tr.

4. The electric power steering apparatus according to claim 3,
   wherein said SAT compensating virtual spring compensating section sets said inclination Kmap' by using an inclination conversion coefficient and said inclination Kmap.

5. The electric power steering apparatus according to claim 4,
   wherein said inclination Kmap' is changed depending on said vehicle speed.

6. The electric power steering apparatus according to claim 2,
   wherein said SAT compensating virtual spring compensating section comprises a gain section, a phase compensating section, and a conversion coefficient section.

7. The electric power steering apparatus according to claim 2,
   wherein said steering angle information is between ±30 degrees relative to a neutral steering angle.

8. The electric power steering apparatus according to claim 1,
   wherein said SAT compensating virtual spring compensating section comprises a gain section, a phase compensating section, and a conversion coefficient section.

9. The electric power steering apparatus according to claim 8,
   wherein said steering angle information is between ±30 degrees relative to a neutral steering angle.

10. The electric power steering apparatus according to claim 1,
    wherein said steering angle information is between ±30 degrees relative to a neutral steering angle.

11. A control apparatus for controlling an electric power steering apparatus that assists and controls a steering system comprising a torsion bar in a column shaft by using an assist map defining a characteristic of said current command value to a steering torque depending on a vehicle speed, comprising:
    a control parameter calculating section that calculates a self-aligning torque (SAT) compensation-cum-virtual spring coefficient used for multiplication performed at a SAT compensating virtual spring compensating section that said electric power steering apparatus comprises and an initial inclination for said assist map based on a parameter that defines a desired steering characteristic at on-center, said SAT compensating virtual spring compensating section outputting a compensation signal to which a SAT compensation-cum-virtual spring torque calculated based on steering angle information and said vehicle speed is converted in accordance with a current conversion coefficient.

12. The control apparatus according to claim 11, wherein said control parameter calculating section calculates said SAT compensation-cum-virtual spring coefficient and said initial inclination based on an inclination of said steering torque to a steering wheel angle or a column angle of a horizontal axis and an intercept of a vertical axis, said inclination and said intercept being obtained when expressing a basic relational expression between said steering wheel angle or said column angle and said steering torque by setting said steering wheel angle or said column angle on said horizontal axis and setting said steering torque on said vertical axis, said basic relational expression being derived based on an approximate relational expression in minute and slow steering, a first relational expression between said steering torque and a torsion bar twist angle with a twist angle coefficient, a second relational expression between said column angle or said steering wheel angle and a SAT value with a SAT coefficient, a third relational expression between an assist torque and said steering torque with an assist coefficient, and a fourth relational expression between said SAT compensation-cum-virtual spring torque and said steering angle with said SAT compensation-cum-virtual spring coefficient.

13. The control apparatus according to claim 12, wherein said control parameter calculating section calculates said initial inclination by using said assist coefficient derived based on said inclination and said intercept and an inclination conversion coefficient.

14. The control apparatus according to claim 12, wherein said SAT compensation-cum-virtual spring coefficient and said initial inclination are changed depending on said vehicle speed.

15. The control apparatus according to claim 14, wherein said SAT compensation-cum-virtual spring coefficient and said initial inclination are calculated by said control parameter calculating section for a plurality of set vehicle speeds, and are calculated by using said SAT compensation-cum-virtual spring coefficient and said initial inclination at said set vehicle speed for a vehicle speed other than said set vehicle speeds by interpolation.

16. The control apparatus according to claim 15, wherein SAT compensation-cum-virtual spring coefficient and said initial inclination at said vehicle speed other than said set vehicle speeds are calculated in said electric power steering apparatus.

17. The control apparatus according to claim 12, wherein said control apparatus comprises a display section that displays said inclination and said intercept.

18. The control apparatus according to claim 11, wherein said control apparatus comprises a display section that displays said inclination and said intercept.

* * * * *